United States Patent [19]

Len et al.

[11] Patent Number: 5,541,237
[45] Date of Patent: Jul. 30, 1996

[54] SYNTHESIS OF POLY(L-LEUCINE)

[75] Inventors: Ching-Hohn Len, Taipei; Chi-Man Ho; Shu-Yi Deng, both of Tau Yen Hsien; Zei-Tsan Tsai, Chung Li, all of Taiwan

[73] Assignee: Institute of Nuclear Energy Research, Taiwan

[21] Appl. No.: 393,895

[22] Filed: Feb. 24, 1995

[51] Int. Cl.$^6$ ............................................. C08J 3/28
[52] U.S. Cl. .......................... 522/162; 522/164; 528/271
[58] Field of Search ................................. 528/271, 328; 522/162, 164

[56]  References Cited

PUBLICATIONS

El–Khair, *Indian Journal of Chemistry*, "Heterogeneous Polymerization of L–Leucine N–Carboxy Anhydride Initiated by Primary Diamines", vol. 21A, Aug. 1982, pp. 811–812.

Stulz, *Makromol. Chem.*, "Secondary Structure of Peptides, 10$^{a)}$· FT–IR and $^{13}$C NMR CP/MAS Study on Tacticity and Secondary Structure of Poly(D,L–leucines)s", vol. 184, (1983), pp. 1311–1322.

*Primary Examiner*—Shelley A. Dodson
*Assistant Examiner*—P. Hampton-Hightower
*Attorney, Agent, or Firm*—Burns, Doane, Swecker & Mathis

[57]  ABSTRACT

The invention relates to a method for synthesis of poly(L-leucine). Without any initiator and solvent poly(L-leucine) has been made from L-leucine-N-carboxy anhydride as starting material in the solid state by irradiation with gamma ray. There is only one step in the entire synthetic processing, and the polymerization yield is 100% and the process is a very simple, safe and convenient method. The poly(L-leucine) is one of the best materials for temporary wound dressing.

9 Claims, No Drawings

SYNTHESIS OF POLY(L-LEUCINE)

FIELD OF THE INVENTION

The present invention relates to a novel synthesis of poly(L-leucine) and, more particularly, to a novel method for synthesis of poly(L-leucine) by irradiation with gamma ray of L-leucine-N-carboxy anhydride in the solid state without any initiator and solvent to produce a high yield of poly(L-leucine).

BACKGROUND OF THE INVENTION

The poly(L-leucine) have been considered to be an important component of temporary burn wound dressing and its synthesis has been described by Stulz J. et al in Makromolecular Chemistry published in 1983. The reported synthetic method of poly(L-leucine) is shown as follows:

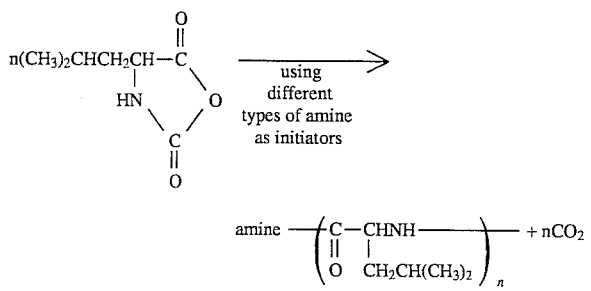

According to a teaching by Abo El-Khair in the Indian Journal of Chemistry, pp. 993–994, October 1982, hexamethylene diamine (HM) was used as initiator and acetonitrile as the solvent. The reaction was taken about 144 hours, with the total yield of 93.1%. When N,N-diethyl 1,3-propane diamine (DPO) and acetonitrile were used as initiator and solvent, respectively, a highest yield of 95.75% was obtained. Although in 1983, almost 100% yield was reported by J. stulz, but a rather high concentration of benzylamine as an initiator and 4 day reaction time were required. At the same time the initiator still remains in the final product and may affect its utilization subsequently.

SUMMARY OF THE INVENTION

Accordingly, we have invented a new simple and convenient method to synthesize poly(L-leucine).

The main object of this invention is to provide a new synthetic method to obtain poly(L-leucine) which may be used as a temporary burn wound dressing. Without any initiator and solvent poly(L-leucine) has been made from L-leucine-N-carboxy anhydride, as starting material in the solid state by irradiation with gamma ray. There is only one step in the synthetic processing, and the polymerization yield is almost 100% and the irradiation time with gamma ray to complete polymerization is about 20 minutes. The new synthesis method of these poly(L-leucine) has also proved to be more simple, more safe and convenient than any known methods in literature.

DETAILED DESCRIPTION OF THE INVENTION

The poly (L-leucine) can be achieved by two steps as follows:

EXAMPLE 1

Synthesis of L-leucine-N-carboxy anhydride: 10 g of L-leucine, 200 mg of active carbon and 100 ml of dried tetrahydrofuran were placed in a 250 ml round flask which is connected with a condensor and a drying tube. The mixture was stirred for 1 hr at 55° C. After filtration with suction, the filtrate was concentrated to a condensed liquid. The crude product was 6.8 g with m.p. of 75°–76 ° C. and was crystalized with a cosolvent benzene and n-hexane.

IR(KBr/v cm$^{-1}$): 3300, 2960, 1813, 1755, 1371, 1295, 1114, 941o $^1$HNMR(400 MHZ, CDcl$_3$/δ ppm): 0.9528(d,3H,CH$_3$), 0.9744(d,3H,CH$_3$), 1.6141–1.7037(m,1H,CH), 1.7427–19380(m,2H,C—CH$_2$—C),

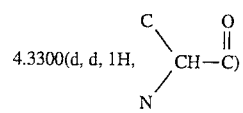

and 7.1551(s,1H,NH)

$^{13}$CNMR(400 MHZ, CDcl$_3$/δ ppm): 21.47(CH$_3$), 22.64(CH$_3$), 24.97(CH), 40.77(CH$_2$), 56.18(CH), 153.06(CO) and

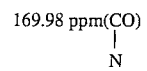

EXAMPLE 2

Synthesis of poly(L-leucine): The solid L-leucine N-carboxy anhydride was sealed into a glass bottle under vacuum(10$^{-4}$ torr) and was subject to gamma ray irradiation with 2.5 to 51.2 kGy dose. Without further chemical treatment pure poly(L-leucine) was obtained with about 100% yield. Viscosity data (FNV-200 Falling Needle Viscosimeter, CF$_3$COOH): The polymer prepared with 2.5 kGy irradiation, was 17.8 cm$^3$/g at 25° C. and the calculated molecular weight was 3410 cm$^3$/g while polymer prepared with 51.2 kGy irradiation and under vacuum was 84.6 cm$^3$/g at 25° C. with calculated molecular weight of 20584 cm$^3$/g.

IR(KBr/v cm$^{-1}$): 3295, 2940, 1655, 1545, 1368, 1294 o $^1$HNMR(400 MHZ, CDcl$_3$/δ ppm): 1.069(6H,2CH$_3$), 1.740–1.833(3H,CH—CH$_2$) 4.788(H,COCH)

$^{13}$CNMR(400 MHZ, CDcl$_3$/δ ppm): 22.149(CH$_3$), 23.101(CH$_3$), 26.505(CH), 42.136(CH$_2$),

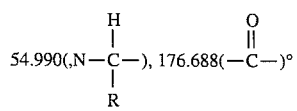

We claim:

1. A method for synthesis of poly(L-leucine) using L-leucine N-carboxy anhydride as the starting material, said method comprising a polymerization of said L-leucine-N-carboxy anhydride by gamma ray irradiation to give a product of polymer of the structure

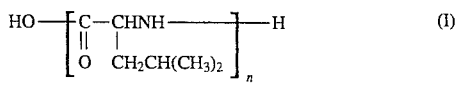

wherein n is from 30 to 182.

2. The method of claim 1, wherein the product of poly(L-leucine) is synthesized by gamma ray irradiation with 2.6 kGy to 51.2 kGy dose on said L-leucine-N-carboxy anhydride.

3. The method of claim 1, wherein polymerization is conducted at a temperature and for a time sufficient to give a polymerization yield of about 100%.

4. The method of claim 1 wherein the irradiation is conducted without any solvent.

5. The method of claim 1 wherein the irradiation is conducted without any initiator.

6. The method of claim 1 wherein the irradiation is conducted in one step.

7. A method for synthesis of poly(L-leucine) using L-leucine-N-carboxy anhydride as the starting material, said method comprising a polymerization conducted at a temperature and for a time sufficient to give a polymerization yield of about 100%, of said L-leucine-N-carboxy anhydride by gamma ray irradiation conducted without any solvent and without any initiator to give a product of polymer of the structure $$HO-\left[\begin{array}{c}C-CHNH\\ \| \quad |\\ O \quad CH_2CH(CH_3)_2\end{array}\right]_n-H \quad (I)$$

wherein n is from 30 to 182.

8. The method of claim 7 wherein the irradiation is conducted in one step.

9. The method of claim 8 wherein the product of poly(L-leucine) is synthesized by gamma ray irradiation with 2.6 kgy to 51.2 kgy dose on said L-leucine-N-carboxy anhydride.

* * * * *